Dec. 12, 1967    R. H. MARANTIER    3,357,136
SEALING STRIP FOR PIVOTAL WINDOWS AND
ASSEMBLY INCORPORATING SAME
Filed Feb. 28, 1966    2 Sheets-Sheet 1
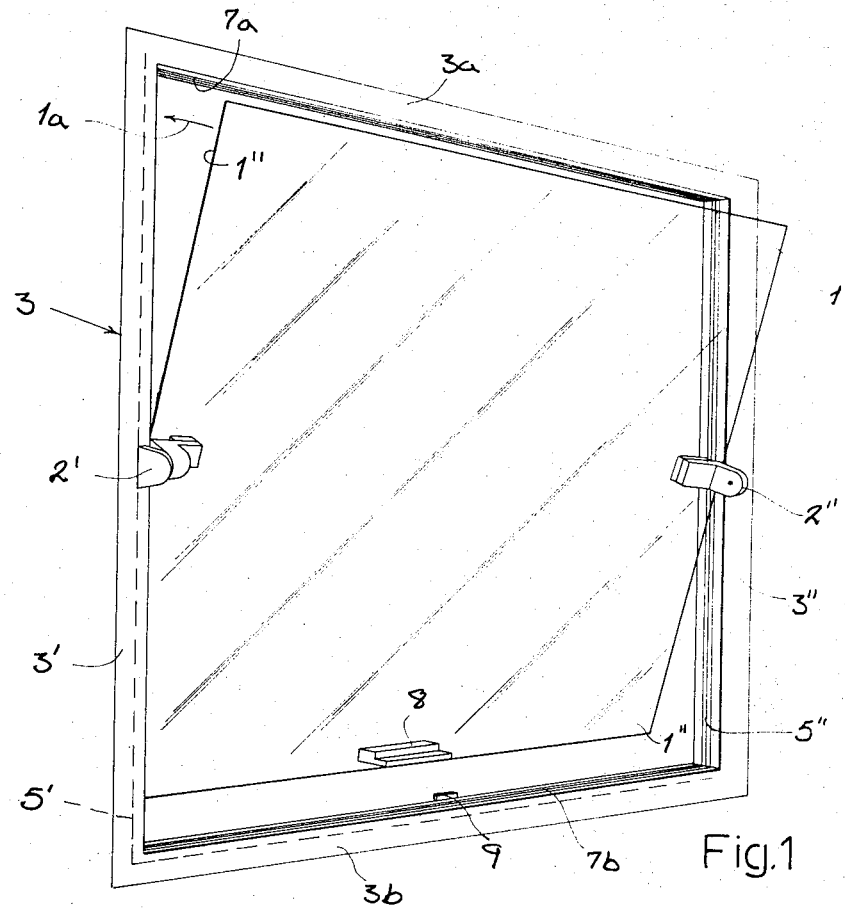
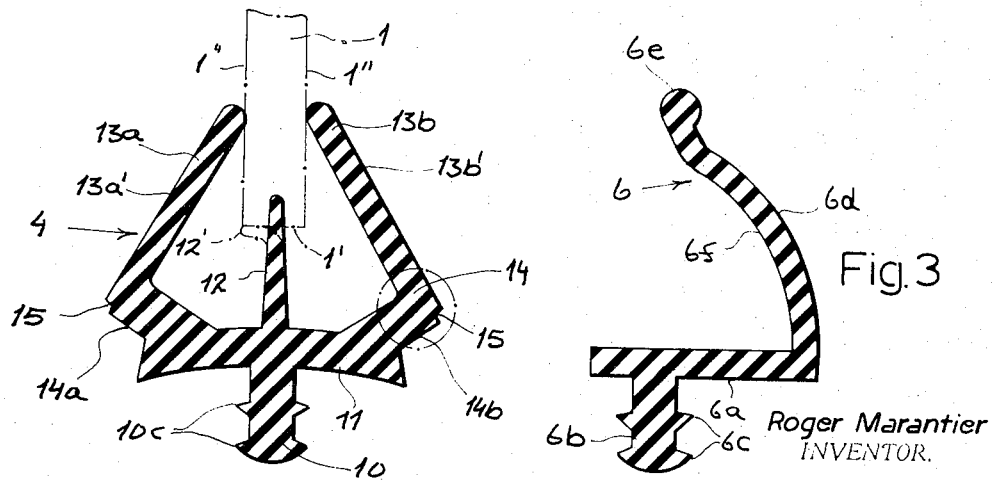
Roger Marantier
INVENTOR.
BY
Attorney Dec. 12, 1967 R. H. MARANTIER 3,357,136
SEALING STRIP FOR PIVOTAL WINDOWS AND
ASSEMBLY INCORPORATING SAME
Filed Feb. 28, 1966 2 Sheets-Sheet 2
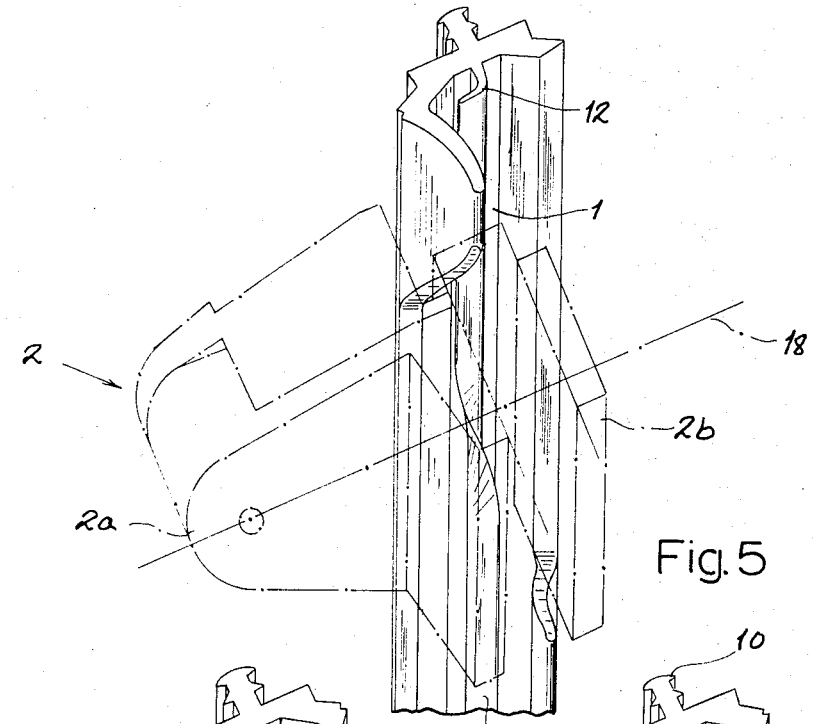
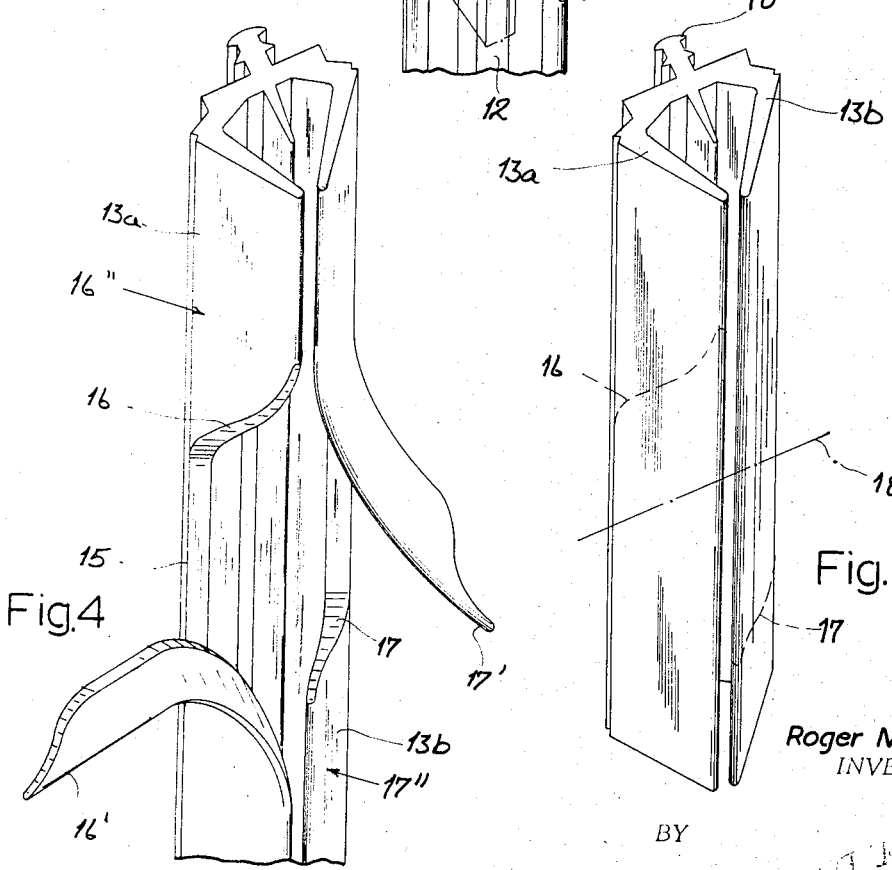
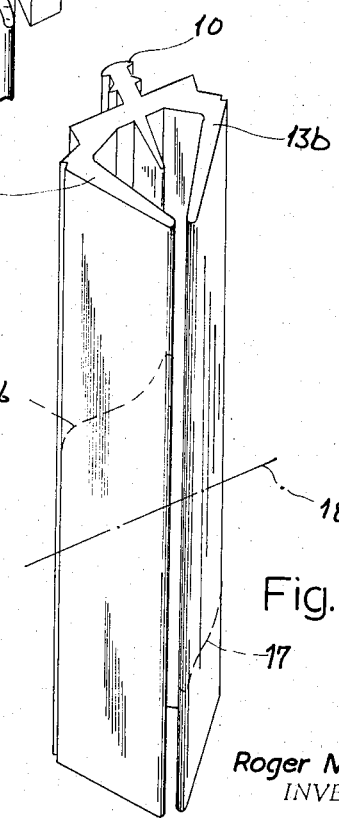
Roger Marantier
INVENTOR.
BY
Karl J. Ross
Attorney

3,357,136
SEALING STRIP FOR PIVOTAL WINDOWS AND ASSEMBLY INCORPORATING SAME
Roger H. Marantier, Paris, France, assignor to Glaces de Boussois, Paris, France, a corporation of France
Filed Feb. 28, 1966, Ser. No. 530,577
Claims priority, application France, Feb. 26, 1965, 7,186
7 Claims. (Cl. 49—392)

My present invention relates to sealing strips for pivotal windows designed to ensure a sealing closure between the pivoting parts and the stationary parts of the window assembly.

Pivoting windows of the type wherein a window pane or other swingable part is mounted centrally or eccentrically (e.g. at one end) for swinging movement in a frame, sash or other stationary part have been proposed heretofore for use within structures with both vertical and horizontal pivotal axes. In general, there have been difficulties in sealing windows of this type against the elements and to prevent the passage of sound waves or other disturbances because of the fact that an effective seal between the pivoting part and a stationary part of the assembly, in its closed condition, requires substantially continuous (i.e. all-around) peripheral engagement by the sealing means of the part with which it is brought into engagement during closure of the assembly. Unlike sliding movements of a window assembly, pivoting movement results in a variable spacing between the movable part and a stationary seal with the extent of such clearance diminishing in the region of the pivot. While many arrangements are capable of sealing the edges of a window assembly parallel to the axis of swinging movement, most of the prior arrangements have been defective for one reason or another with respect to the sealing along the window edges perpendicular to the pivotal axis also concerned. These disadvantages were even more noticeable when the pivot was disposed at an intermediate location along these latter edges whereby deficient seals permitted considerable leakage at such intermediate locations. In fact, therefore, the seal had discontinuity at the locations of the pivots. Moreover, earlier devices impeded the opening and closing operations and made the systems difficult to use.

It is the principal object of the present invention, therefore, to provide a sealing arrangement for pivotal window assemblies wherein the aforedescribed disadvantages can be avoided and which is capable of sealing such assemblies against penetration by sound and the elements, is substantially unaffected by repeated opening and closing of the assembly but whereby such movement is not impeded, and is of relatively simple and inexpensive construction but capable of maintaining a continuous seal even at the region of the pivots of the assembly.

A further object of this invention is to provide a sealing arrangement for a pivotal window assembly that is capable of restricting frictional stresses applied to the seal and resistance to opening and closing movements of the window.

These objects and others, which will become apparent hereinafter, are attained in accordance with the present invention, through the provision of a sealing arrangement for a window assembly or like arrangement in which a generally planar movable part is pivotally mounted within a generally planar stationary part forming a frame for the movable part, the mounting means defining a pivotal axis parallel to or in the plane of the movable part whereby the latter can swing into or out of the plane of the frame, the sealing means extending substantially continuously around the interior of the frame for all-around peripheral engagement with the movable part (e.g. a windowpane) in the closed condition of the assembly. The sealing means of this invention advantageously comprises, at least along the edges of the frame opening provided with the mounting means or pivots, at least one continuous longitudinally extending resilient tongue lying in the plane of the movable part in the closed condition of the assembly and bearing upon the corresponding edge of the movable part without discontinuity and deflectable or flattenable thereby in either direction. According to an important feature of this invention, this continuous tongue is flanked by at least one resiliently deflectable pressure flange mounted upon a common base with the tongue and adapted to bear laterally upon a face of the movable member, two such flanges preferably being provided on opposite faces of the movable part. Thus the base of a sealing strip for the edges of a pivotal window assembly will comprise a base, advantageously having mounting means for securing the base along an inner edge of the window frame along the side thereof provided with the pivot, a central continuous tongue extending from the base and integral (in one-piece construction) therewith coplanar with the windowpane but flattenable to one side or the other by the edge of the pane, and a pair of flanges spacedly flanking this central tongue but extending inwardly (i.e. into the window opening) therebeyond for engagement with opposite faces of the movable member, these flanges being likewise integral with the base so that the flanges (base, attachment means and tongue form a monolithic structure composed of an elastomeric material.

According to an important feature of this invention, I provide means for selectively reducing the pressure with which the lateral tongues or flanges bear against the faces of the window to permit these tongues to be deflected by the window outwardly during an opening movement thereof and thus reduce materially the force required to swing the window into and out of engagement with the sealing means as represented by the lateral flanges. When a swinging movement of the window is to be provided in either sense from its closed condition about the pivot, such means can be provided all along the knees defining the axis of articulation of the flanges upon their respective ligaments. The means for suppressing the pressure of these flanges against the opposite faces of the window as mentioned above, advantageously includes outward concavities extending along the laterally outward edges of these knees parallel to the articulation axis. The concavities can, therefore, extend along the length of the sealing member desired without materially reducing the sealing capacity inasmuch as, in the closed condition of the assembly, the center tongue maintains continuous contact with the edge of the window.

To prevent the edge of the window from severing the sealing member in an undesirable manner and preclude a resistance to the movement of the window by the sealing member, it is formed, in accordance with this invention, with a generally spiroidal cut through the flanges in the region of the pivot so that flaps of the flanges are formed to extend beyond the pivot from opposite sides. Advantageously, the spiral cut is made along the line described by the edge of the glass pane as it swings about the axis and intersects the plane of the inwardly turned flange. Since the flaps are attached at one extremity to the base and the unsevered remainder of the respective flanges, they do not materially impede the opening and closing movement of the window. The cuts extend generally along a helix centered on a longitudinal axis of the sealing member or along spirals whose centers are located at the pivot axis. When relatively thick glass is employed (e.g. thickness of above about 1 cm.), it may be necessary to provide the continuous-contact tongue means as a plurality of laterally spaced tongues whose transverse distance is less than the glass thickness but all of which can be deflected to either side upon pivotal movement of the window.

The above and other objects, features and advantages of the present invention will become more readily apparent from the following description, reference being made to the accompanying drawing in which:

FIG. 1 is a perspective view of a pivotal-window assembly according to the present invention;

FIG. 2 is a cross-sectional view through the sealing means along one of the vertical sides of this window;

FIG. 3 is a corresponding view through one of the sealing members along a horizontal edge of the window;

FIG. 4 is a perspective view of the sealing member of FIG. 2 showing the flanges cut away;

FIG. 5 is a perspective view illustrating the function of the center tongue; and Fig. 6 is a perspective view of the seal of FIG. 2 prior to cutting of the flanges to accommodate the pivoting action.

In FIG. 1, I show a pivoting window assembly which comprises a window pane 1 constituting the movable part of the assembly and mounted upon a pair of trunnions 2′, 2″ for pivoting movement about a horizontal axis offset from but parallel to the plane of the window 1. The stationary part of the window assembly is constituted by a window frame 3 which is likewise generally planar and accommodates the window pane 1 in the closed condition of the assembly. The window 1 can be swung out of the plane of the frame 3 as is illustrated in FIG. 1 about the axis defined by the trunnions 2′ and 2″ which are mounted upon the vertical sides 3′ and 3″ of the frame. The upper and lower sides 3a and 3b thereof connect the vertical sides to form a rigid stationary window part. The sealing of the window in its closed condition is obtained via a pair of longitudinally extending extruded elastomeric sealing members 4 (FIG. 2) which are seated in groove 5′ and 5″ in the vertical frame members 3′ and 3″ in the plane of the window 1 when the latter is in its closed condition. The frame members 3′, 3″, 3a and 3b may be metallic profiles, (e.g. extruded aluminum or aluminum alloy) provided integrally with the grooves or channels 5′ and 5″ or may be assembled from several pieces to define these channels between them. A pair of further sealing members 6 (FIG. 3) are disposed in respective grooves 7a and 7b along the horizontal edges of the window frame. As can be seen from FIGS. 1 and 3, each sealing member 6 is also formed by extrusion from an elastomeric material and is provided with a base 6a from which a connecting tongue 6b depends. The tongue 6b extends longitudinally along the respective strip 6 and has head-like formations 6c (e.g. beads, dovetails or the like) forming a snap or friction fit within the respective groove 7a or 7b. A contacting flange 6d extends inwardly from one edge of the base 6a into the frame opening and is curved so as to overlie the base 6a with its beaded formation 6e; the latter is advantageously disposed in the plane of the tongue 6b. The members 6 are seated in their respective grooves 7a and 7b so that the beaded edge 6a of the flange 6d and the concavity 6f defined by this arcuate flange face a confronting marginal portion of the window frame 1 when the latter is swung into its closed condition (arrow 1a in FIG. 1). Thus the beaded portions 6e engage opposite faces of the window pane 1 in the closed condition of the assembly in which the latch member 9 cooperates with a locking grip 8 in the conventional manner.

The vertical sealing members 4 (FIG. 2) are likewise monolithically formed from an elastomeric material with the indicated profile (e.g. by conventional extrusion methods) and comprise a multiple-barb tongue 10 whose formations 10c form a multiple-head arrangement adapted to frictionally hold the sealing member in the respective groove 5′ or 5″ or cooperate with flanges overlying these grooves in a snap-type connection. The tongue 10 extends centrally from a base 11 carrying a central tongue 12 which is deflectable when in place in the frame 3 as represented by dot-dash lines at 12′ by the corresponding edge 1′ of the window 1 and maintains a continuous contact with this edge. The central tongue 12 is flanked by a pair of inwardly extending longitudinal flanges 13a and 13b adapted to bear against the opposite faces 1″ of the center plane 1 and, therefore, projecting inwardly (into the frame opening) beyond the longitudinally extending continuous-contact tongue 12. These flanges 13a and 13b are articulated upon respective ligaments 14a, 14b connecting the ends of the tongues 13a, 13b with the base 11 whereby the ligaments form angular tongues with the flanges. The articulation between each ligament 14a, 14b and the respective flange 13a, 13b is constituted by flexible knees as represented within the broken-line circle 14 of FIG. 2. The flexibility of this articulation is selectively increased by forming the junction between the ligament 14a or 14b and the respective flange 13a or 13b selectively with longitudinal concavities 15 along the outer edges. This arrangement deemphasizes the flanges 13a and 13b where required. The longitudinal flanges are cut through along the broken line 16 and 17 in FIG. 6 to form flaps 16′ and 17′ of the respective fianges 13a and 13b which lie on opposite sides of the axis 18 of rotation of the window and the plane through this axis perpendicular to the window pane 1 whereby swinging movement of the window 1 will bias these flaps outwardly. The inward inclination of the faces 13a′ and 13b′ of the flanges 13a and 13b permits the edges 1′ of the pane 1 to glide along the flange while camming it inwardly as the window is returned to its closed condition, the surface being then intercepted by the other flange and firmly lodged between the flanges 13a′ and 13b′, the deflected one of which springs back into place against the respective face of the movable part of the window.

Each of the sealing members 4 is mounted in the respective vertical member 3′, 3″ of the stationary part of the assembly and receives between its flanges 13a and 13b the movable part of the window in its closed condition. Then central tongue 12 is continuously deflected or flattened (to either side) by the edge of the movable portion 1. The double-head formation 10, when forced into the respective slot 5′ and 5″, is held by suction to maintain the seal between this edge of the window 1 and the frame. The seal along the horizontal frame 3a and 3b is effected by engagement of the surfaces 1″ with the upper and lower members 6 at the beads 6a.

In FIG. 5, the operation of the system is illustrated in greater detail. In this figure, the pivotal assemblies are repersented at 2 in broken lines and the pane of glass is shown to be sandwiched between the swingable portion 2a of each pivot and an attachment plate 2b. In this figure, it can also be seen that the center tongue 12 remains in continuous contact with the edge of the glass even when the latter is pivoted out of the plane of the frame whereupon this contact is maintained at the edge of the glass pane 1 in the pivot region. Upon return of the pane to the plane of the tongue 12 contact is resumed over the entire edge. Moreover, the cutting of the flanges 13a and 13b at 16 and 17 to form the flaps 16′ and 17′ permit the portions of the respective flanges opposite these flaps with respect to the pivot axis to be deflected inwardly as represented by arrows 16″ and 17″ when the pane 1 is returned to its closed condition. The other portions of these flanges 13a and 13b are continuous with the flaps and intercept the pane when it is returned in the manner indicated. The flaps 16′ and 17′ thus further ensure the maintenance of a seal in the region of the pivots and are, therefore, intended to extend from one side of the axis to the other. The flanges 13a and 13b function as levers urged under a resilient bias against the faces of the glass plate 1 while the tongue 12 bears resiliently against its edge. The seal is thus more substantial than has been obtainable with systems interrupted in the region of the pivot. It will also be evident that the arrangement is suitable for use with a pivotal assembly in which the pivot is located at an extremity of the pane or other movable part as well as with doors or other assemblies requiring such seals. The concavities 15 selectively reduce the resistance of the levers to deflection and thus decrease interference with opening and closing movements of the window, while the cuts 16, 17 prevent blockage of such movement by the seal.

These and other modifications and variations of the present invention are deemed to be within the ability of persons skilled in the art and the scope of the appended claims.

I claim:

1. A sealing arrangement for a pivotal assembly having a generally planar frame and a generally planar movable part swingably mounted in said frame for pivotal movement into and out of the plane of said frame, said movable part having at least one edge extending transversely to its pivotal axis and parallel to a corresponding portion of said frame in a closed condition of said assembly, said sealing arrangement comprising a sealing member of a resilient material interposed between said frame portion and said edge and provided with a base, connecting means extending from said base for securing same to said frame portion, at least one continuous longitudinal tongue extending from said base away from said connecting means and adapted to bear continuously against said edge in all positions of said movable part, said tongue being flattened thereby in said closed condition of said assembly, a pair of flanges laterally spaced from and flanking said tongue while projecting beyond said tongue for engagement with opposite faces of said movable part on opposite sides of said edge, and means enabling selective deflection of said flanges by said movable part.

2. A sealing arrangement for a pivotal assembly having a generally planar frame and a generally planar movable part swingably mounted in said frame for pivotal movement into and out of the plane of said frame, said movable part having at least one edge extending transversely to its pivotal axis and parallel to a corresponding portion of said frame in a closed condition of said assembly, said sealing arrangement comprising a sealing member of a resilient material interposed between said frame portion and said edge and provided with a base, connecting means extending from said base for securing same to said frame portion, at least one continuous longitudinal tongue extending from said base away from said connecting means and adapted to bear continuously against said edge in all positions of said movable part, said tongue being flattened thereby in said closed condition of said assembly, a pair of flanges laterally spaced from and flanking said tongue while projecting beyond said tongue for engagement with opposite faces of said movable part on opposite sides of said edge, and means enabling selective deflection of said flanges by said movable part, said movable part being a window and said assembly including pivotal means for swingably mounting said window on said frame for pivoting movement about an axis offset from said planes but parallel thereto, said pivotal means being disposed along said frame portion, said frame portion being formed with a longitudinally extending channel opening in the direction of said edge, said connecting means including a longitudinally extending resilient formation having at least one head receivable in said channel and being unitary with said base, said member further comprising a pair of longitudinally extending ligaments connecting said base with said flanges, said flanges being directed inwardly toward one another for resiliently bearing upon opposite faces of said window; said flanges, said ligaments and said tongue forming a unitary body with said base.

3. A sealing arrangement as defined in claim 2 wherein said ligaments adjoin the respective flanges angularly and form flexible knees at their junctions with said flanges at which said flanges are articulated for resilient deflection, said knees having outer longitudinally extending concavities running therealong and facilitating selective deflection of said flanges inwardly and outwardly for opening and closing movements of said windows while said tongue maintains continuous contact with said edge and is deflectable thereby.

4. A sealing arrangement as defined in claim 3 wherein said frame and said window are of rectangular outline, said pivot means being disposed along opposite sides of the rectangle, a pair of sealing members being provided each along one of said sides of the rectangle, said sealing arrangement further comprising a pair of other sealing members each lodged in said frame and engageable with edges of said window generally parallel to said axis, said sealing members together being in all-around pivotal engagement with said window in said closed condition.

5. A sealing arrangement as defined in claim 3 wherein each of said flanges is cut through substantially to the respective concavity to form a respective flap lying along a respective face of said window and deflectable thereby during opening of said window, said flanges being deflectable outwardly beyond the respective flaps by said window during the opening movement thereof.

6. A sealing arrangement as defined in claim 5 wherein said tongue lies in the plane of said window in said closed condition of said assembly and is deflectable by said movable part to either side, said flanges being disposed symmetrically on opposite sides of said tongue, said ligaments extending upwardly and outwardly from said base, said connecting means being provided in the plane of said tongue.

7. A sealing arrangement as defined in claim 5 said cuts extend along spiral curves.

References Cited

UNITED STATES PATENTS

| 2,692,791 | 10/1954 | Walker | 49—391 |
| 2,857,588 | 10/1958 | Korol | 49—495 X |
| 2,933,777 | 4/1960 | Livsey et al. | 49—392 X |

FOREIGN PATENTS

| 988,469 | 4/1965 | Great Britain. |

KENNETH DOWNEY, *Primary Examiner.*